United States Patent
Götz

(10) Patent No.: US 10,700,587 B2
(45) Date of Patent: Jun. 30, 2020

(54) MULTILEVEL CONVERTER

(71) Applicant: Dr. Ing. h.c. F. Porsche Aktiengesellschaft, Stuttgart (DE)

(72) Inventor: Stefan Götz, Forstern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 305 days.

(21) Appl. No.: 15/636,028

(22) Filed: Jun. 28, 2017

(65) Prior Publication Data

US 2018/0013339 A1    Jan. 11, 2018

(30) Foreign Application Priority Data

Jul. 5, 2016 (DE) .................. 10 2016 112 250

(51) Int. Cl.
*H02M 1/08* (2006.01)
*H02M 7/483* (2007.01)
*H02M 3/06* (2006.01)

(52) U.S. Cl.
CPC .............. *H02M 1/08* (2013.01); *H02M 3/06* (2013.01); *H02M 7/483* (2013.01); *H02M 2007/4835* (2013.01)

(58) Field of Classification Search
CPC ................. H02M 1/08; H02M 7/483; H02M 2007/4835; H02M 3/06; H02M 3/07; H02M 3/073; H02M 2003/077; G11C 5/145

See application file for complete search history.

(56) References Cited

U.S. PATENT DOCUMENTS

2014/0049230 A1    2/2014 Weyh

FOREIGN PATENT DOCUMENTS

| CN | 105429495 A | 3/2016 |
|---|---|---|
| DE | 102014110410 A1 | 1/2016 |
| EP | 2595302 A1 | 11/2011 |
| EP | 2408081 A1 | 1/2012 |
| WO | 2012072168 A2 | 6/2012 |

OTHER PUBLICATIONS

"Current Source Modular Multilevel Converter for HVDC and Facts", Jiaqi Liang et al., 2013 15th European Conference on Power Electronics and Applications (EPE), DOI: 10.1109/EPE.2013. 6634735, pp. 1-10, Sep. 3, 2013, 10 pages.

(Continued)

*Primary Examiner* — Jung Kim
(74) *Attorney, Agent, or Firm* — RatnerPrestia

(57) ABSTRACT

An electronic system includes a plurality of switching elements (T) and a plurality of energy storage elements (L; C). The energy storage elements (L; C) are connected to one another by the switching elements (T). The energy storage elements (L; C) can be selectively switched to a first, a second or a third state by switching the switching elements (T). In the first state, the energy storage elements (L; C) are connected in series with one another. In the second state, the energy storage elements (L; C) are connected in parallel with one another. In the third state, the energy storage elements (L; C) are bypassed, wherein two of the energy storage elements (L; C) are each connected by no more than three of the switching elements (T).

11 Claims, 9 Drawing Sheets

(56) References Cited

OTHER PUBLICATIONS

"Semi-Full-Bridge Submodule for Modular Multilevel Converters," K. Ilves et al., 9th International Conference on Power Electronics—ECCE, Asia; Jun. 1-5, 2015/63 Convention Center, Seoul Korea, 8 pages.
Notice of Preliminary Rejection for Korean Application No. 10-2017-0085500, dated Oct. 16, 2018, 4 pages.
"HVDC Light", ABB, [online], Dec. 2012, [searched on Sep. 12, 2018]. 66 pages, URL:https://new.abb.com/docs/default-source/ewea-doc/hvdc-light.pdf.
Notification of Reason for Rejection for Japanese Application No. 2017-127074, dated Apr. 19, 2018, 2 pages.
English translation of the Chinese Office Action for Chinese Application No. 2017105323597, dated Jan. 28, 2019, 6 pages.

MULTILEVEL CONVERTER

CROSS-REFERENCE TO RELATED APPLICATION

This application claims priority to German Patent Application No. DE 10 2016 112 250.5, filed Jul. 5, 2016, which is incorporated by reference herein in its entirety.

FIELD OF THE INVENTION

The invention relates to an electronic system with a plurality of switching elements and a plurality of energy storage elements, wherein the energy storage elements are connected to one another by means of the switching elements, wherein the energy storage elements can be selectively switched to a first, a second or a third state by switching the switching elements, wherein, in the first state, the energy storage elements are connected in series with one another, wherein, in the second state, the energy storage elements are connected in parallel with one another, and wherein, in the third state, the energy storage elements are bypassed.

BACKGROUND OF THE INVENTION

Converters are used to generate a current with a periodically changing voltage amplitude from a direct current that is output by an energy storage element. Converters from the prior art use semiconductor elements as switching elements with particularly short switching frequencies.

Furthermore, a technology that is also referred to as a multilevel converter is known from the prior art, in which individual modules each having an energy storage element can be interconnected between different states dynamically during operation of the converter. The modules can be connected in series with one another or in parallel with one another. Furthermore, it is possible to bypass the modules. An output voltage of the converter is thus generated by dynamically connecting the energy storage elements in series and in parallel.

The manufacturing costs of known multilevel converters are brought about, inter alia, by a high number of switching elements. Furthermore, a relatively high number of switching elements also causes a relatively large energy loss.

EP 2 408 081 A1, which is incorporated by reference herein, and EP 2 595 302 A1, which is also incorporated by reference herein, disclose multilevel converters, in which bipolar converter cells are connected to four switching elements and unipolar converter cells are connected to two switching elements. The converter cells can be connected in series or bypassed by switching the switching elements.

SUMMARY OF THE INVENTION

Described herein is an electronic system that can be switched in a flexible manner and that has low manufacturing costs and low energy losses.

The electronic system comprises a plurality of switching elements and a plurality of energy storage elements. The energy storage elements are connected to one another by means of switching elements. The energy storage elements can be switched to a first, a second or a third state. In the first state, the energy storage elements are connected in series. In the second state, the energy storage elements are connected in parallel with one another. In the third state, the energy storage elements are bypassed. Two of the energy storage elements are each connected by means of no more than three of the switching elements.

The manufacturing costs of the electronic system are kept low by the relatively low number of switching elements that are used to connect the energy storage elements to one another. Furthermore, a relatively high level of flexibility is achieved by the fact that the energy storage elements can be switched to the three different states.

In accordance with one embodiment of the invention, the electronic system can be embodied as a converter. The converter can be embodied, in particular, to output a voltage having a single polarity and a periodically varied voltage amplitude as the output voltage. The energy storage elements can be embodied to output a DC voltage. Switching the switching elements to the first and the second state converts the DC voltage to the output voltage.

In accordance with one embodiment of the invention, it is possible for the switching elements and the energy storage elements to be able to be connected to one another in a modular manner. This is understood to mean, in particular, that one of the energy storage elements together with a plurality of switching elements forms a module. Said module can comprise a housing, for example, in which switching elements and the energy storage element of the module are arranged. A high level of flexibility of the electronic system is achieved by the modular connection capability.

By way of example, it is possible for one of the energy storage elements and three of the switching elements to be arranged in the housing of a module in each case. Using modules of this kind, the electronic system can be constructed merely by connecting a plurality of modules to one another. It is then particularly easy and convenient to alter the system by adding a further module or removing a module.

In accordance with one embodiment of the invention, the system can comprise a control element, which is embodied to switch the switching elements. This is advantageous, in particular, in order to adapt the output voltage that is output by the electronic system very precisely to demands.

In accordance with one embodiment of the invention, the energy storage elements can be embodied as capacitors, battery cells, solar cells and/or electromagnetic energy stores. An electromagnetic energy store can comprise, for example, a coil, in which electromagnetic energy can be stored.

In accordance with one embodiment of the invention, the switching elements can be embodied as mechanical switches, as transistors and/or as thyristors. The use of transistors and/or thyristors is advantageous, in particular, in order to be able to achieve particularly short switching times.

In accordance with one embodiment of the invention, the electronic system can comprise at least one deactivation element, which is associated with one of the energy storage elements. It is possible for the energy storage element to be able to be switched to a deactivated state by the deactivation element. In the context of the present description, the deactivated state is understood here to mean, in particular, that the energy storage element is connected to the other energy storage elements and the switching elements at the very most by means of an electrical connection, such that no electric current can flow through the deactivated energy storage element.

The deactivation element can be embodied, for example, in a similar or identical manner to the switching elements. It is also possible for the deactivation element to be embodied as a fuse, which deactivates the energy storage element associated with the deactivation element in the case of an excessively large flow of current. The excessively large flow of current may be attributable to a fault in the energy storage element, such that the deactivation makes it possible to prevent damage to other components of the electronic system. The embodiment of the deactivation element in a similar or identical manner to the switching elements is advantageous, in particular, in order to deactivate the energy storage element associated with the deactivation element when a fault has been detected.

In accordance with one embodiment of the invention, when first energy storage elements of the energy storage elements are connected in parallel, it is possible for second energy storage elements of the energy storage elements to be able to be bypassed. The flexibility of the electronic system is further increased as a result. It is possible, for example, to protect the second energy storage elements while the first energy storage elements are connected in parallel with one another.

In accordance with one embodiment of the invention, it is possible for the second energy storage elements to be able to be bypassed by switching one of the switching elements. It is possible, in particular, for the second energy storage elements to be able to be bypassed by switching precisely one single switching element. This enables particularly simple bypassing of the second energy storage elements.

In accordance with one embodiment of the invention, it is possible for, when the second energy storage elements are bypassed, a third energy storage element of the energy storage elements to be able to be connected in parallel with the first energy storage elements. This further increases the flexibility of the electronic system.

BRIEF DESCRIPTION OF THE DRAWINGS

Further features and advantages of the present invention will become clear from the below description of preferred exemplary embodiments with reference to the attached drawings. Here, the same reference numerals are used for identical or similar components and for components having identical or similar functions.

In the figures, switching elements are designated hereinafter by the letter T, energy storage elements by the letter L or C. The elements can be differentiated from one another by a number following the respective letter.

DETAILED DESCRIPTION OF THE INVENTION

Figure 1:
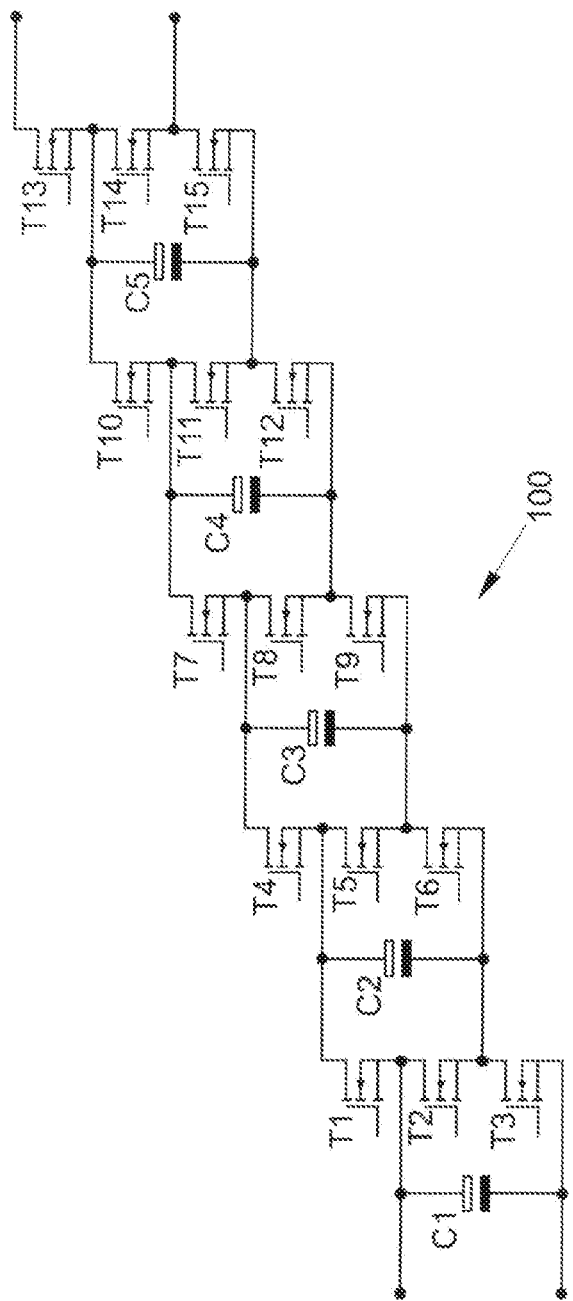
FIG. 1 shows an electronic system with a plurality of energy storage elements and switching elements in accordance with an embodiment of the invention.

The electronic system 100 illustrated in FIG. 1 comprises a plurality of switching elements T1 to T15 and a plurality of energy storage elements C1 to C5. In the electronic system 100, the switching elements T1 to T15 are embodied as semiconductor switches in the form of transistors. The switching elements T1 to T15 can be switched to an on and to an off state. The below text will only describe which switching elements are switched to the on state. The switching elements that are not mentioned are switched to the off state.

The electronic system 100 furthermore comprises two input terminals, which are connected to the energy storage element C1, and two output terminals, of which one is connected to the switching element T13 and one is connected to the two switching elements T14 and T15. However, it is also possible to interconnect the electronic system 100 in the reverse order, such that one of the input terminals is connected to the switching element T13 and the other input terminal is connected to the two switching elements T14 and T15. In this case, the output terminals are connected to the energy storage element C1.

Each of the energy storage elements C1 to C5 has a first and a second connection. Two of the energy storage elements C1 to C5 are each connected by means of three of the switching elements T1 to T12. In this case, the first connections are each connected to one another by means of one of the switching elements T1, T4, T7 and T10. The second connections are each connected to one another by means of one of the switching elements T3, T6, T9 and T12.

The second connection of the energy storage element C2 is connected to the first connection of the energy storage element C1 by means of the switching element T2. In a similar manner, the second connections of the energy storage elements C3 to C5 are each connected to the first connection of the preceding energy storage element C2 to C4 by means of the switching elements T5, T8 and T11.

The energy storage element C5 is connected to the two output and/or input terminals by means of the switching elements T13 to T15.

The interconnection of the electronic system 100 enables the energy storage elements C1 to C5 to be switched to three different states. The energy storage elements C1 to C5 can be connected in series if the switching elements T2, T5, T8, T11 and T14 are switched on. The energy storage elements C1 to C5 can be connected in parallel with one another if the switching elements T1, T3, T4, T6, T7, T9, T10, T12, T13 and T15 are switched on. The energy storage elements C1 to C5 can be bypassed if the switching elements T3, T6, T9, T12 and T15 are switched on. Alternatively, the energy storage elements C1 to C5 can also be bypassed if the switching elements T1, T4, T7, T10 and T13 are switched on. If none of the switching elements T1 to T15 is switched on, the electronic system 100 is deactivated. Current is not released from the energy storage elements C1 to C5 nor is current stored in the energy storage elements C1 to C5. In this state, no current can be conducted through the electronic system 100.

By suitably switching the switching elements T1 to T15, the electronic system 100 can be operated as a converter, which generates from the DC voltages of the energy storage elements C1 to C5 a voltage having a periodic voltage amplitude profile applied to the output terminals.

Figure 2:
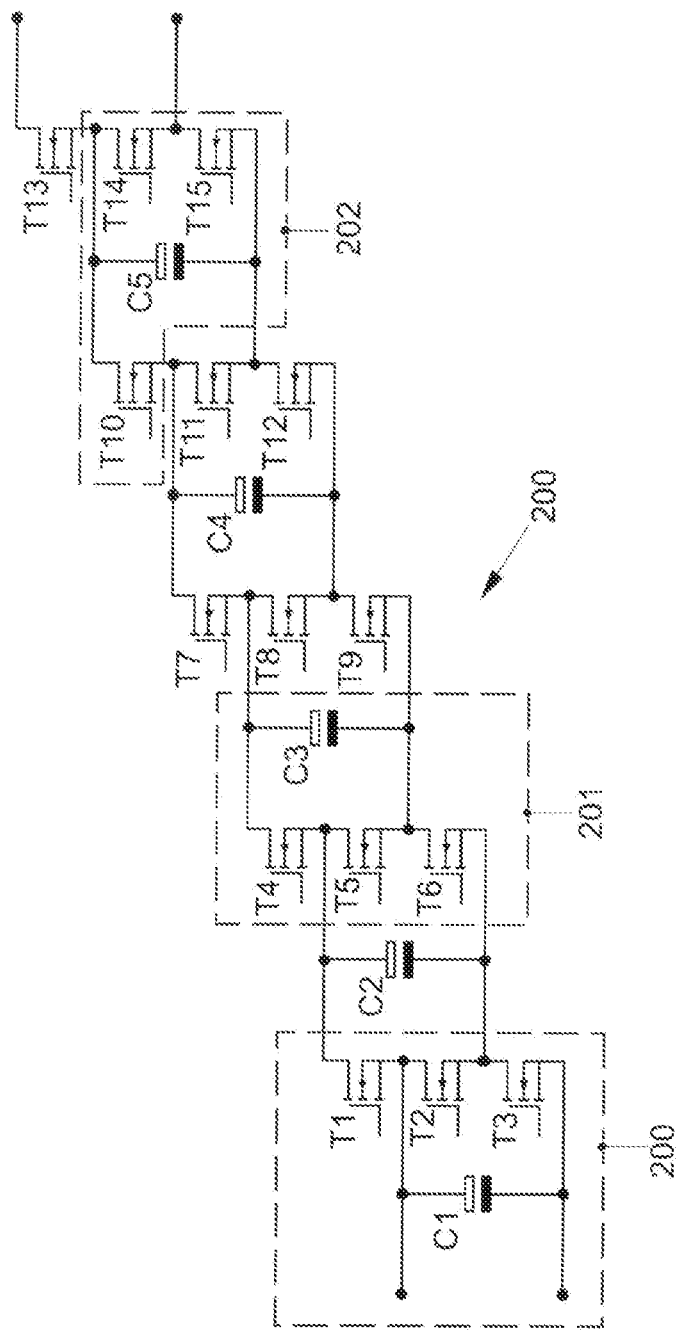
FIG. 2 shows the electronic system from FIG. 1, in which in each case some of the switching elements with in each case one of the energy storage elements are component parts of a module.

FIG. 2 illustrates, by way of example, how some of the switching elements T1 to T15 and the energy storage elements C1 to C5 of the electronic system 100 can be combined to form modules 200, 201 and 202. Each of the modules 200, 201 and 202 comprises one of the energy storage elements C1 to C5 and three of the switching elements T1 to T15. The module 200 comprises the energy storage element C1 and the switching elements T1 to T3. The module 201 comprises the energy storage element C3 and the switching elements T4 to T7. The module 202 comprises the energy storage element C5 and the switching elements T10, T14 and T15.

The electronic system 100 may be designed in a modular manner in a simple way by means of respectively identical modules 200, 201 or 202. This allows particularly easy addition or removal of modules and a high level of flexibility.

Figure 3:
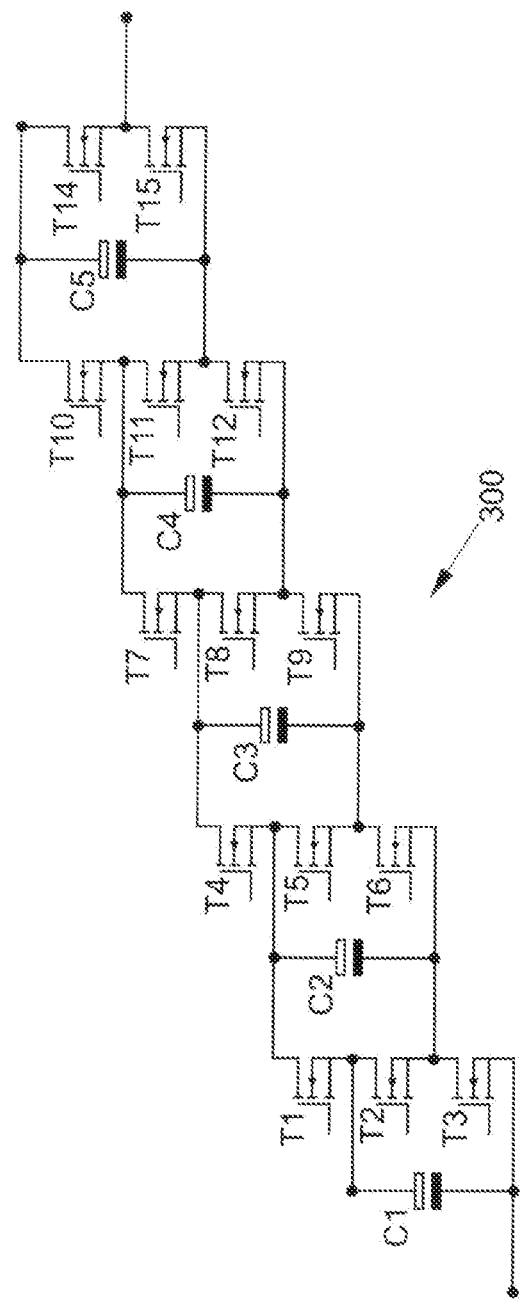
FIG. 3 shows an electronic system in accordance with an embodiment of the invention.

The electronic system 300 from FIG. 3 differs from the electronic system 100 from FIGS. 1 and 2 in that, in particular, the switching element T13 is not present. The switching element T13 can be omitted since the electronic system 300 comprises only one output and one input terminal. The output and/or input terminal is then connected to the energy storage element C5 by means of the switching elements T14 and T15.

Figure 4:
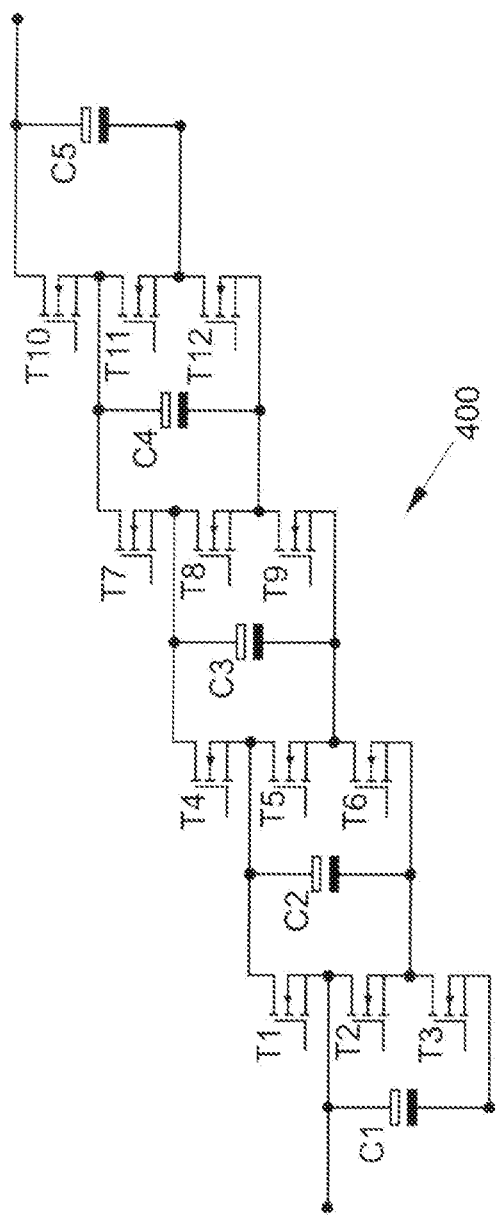
FIG. 4 shows an electronic system in accordance with an embodiment of the invention.

As can be seen in FIG. 4, when there is only one output and input terminal it is also possible that, in addition to the switching element T13, the switching elements T14 and T15 are also not present. The energy storage element C5 is then connected directly to the output and/or input terminal.

Figure 5:
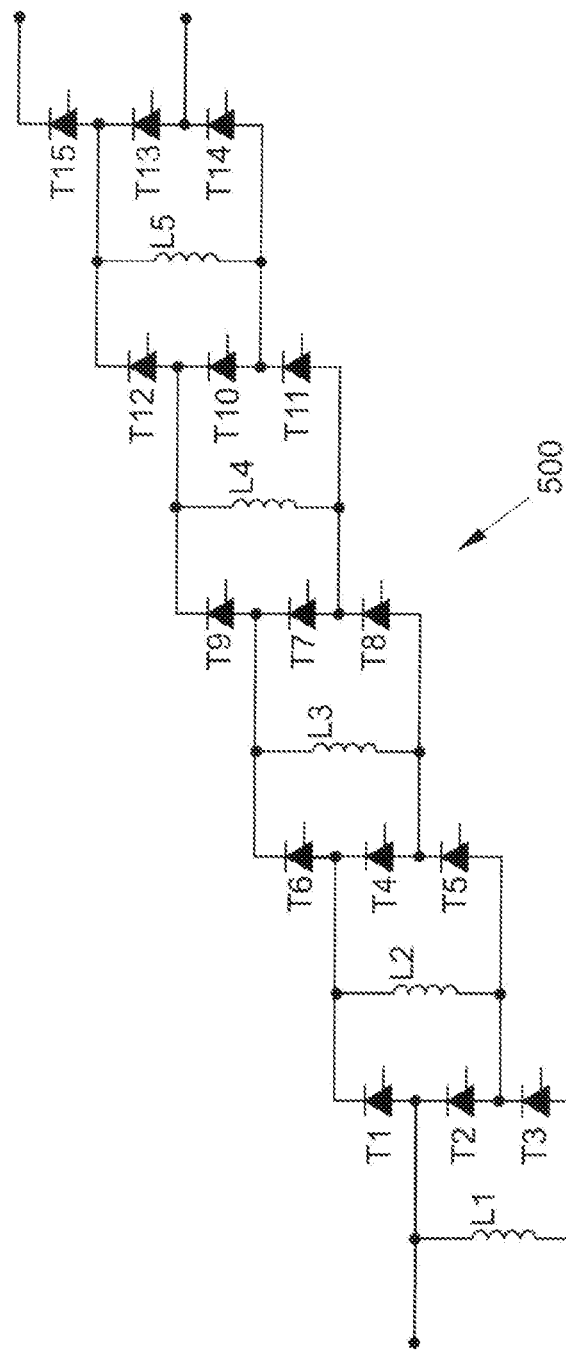
FIG. 5 shows an electronic system in accordance with an embodiment of the invention.

The electronic system 500 illustrated in FIG. 5 comprises switching elements T1 to T15 and electromagnetic energy storage elements L1 to L5, which are connected to one another in the same way as the switching elements T1 to T15 and the energy storage elements C1 to C5 of the electronic system 100. In the electronic system 500, the switching elements T1 to T15 are embodied as thyristors.

Figure 6:
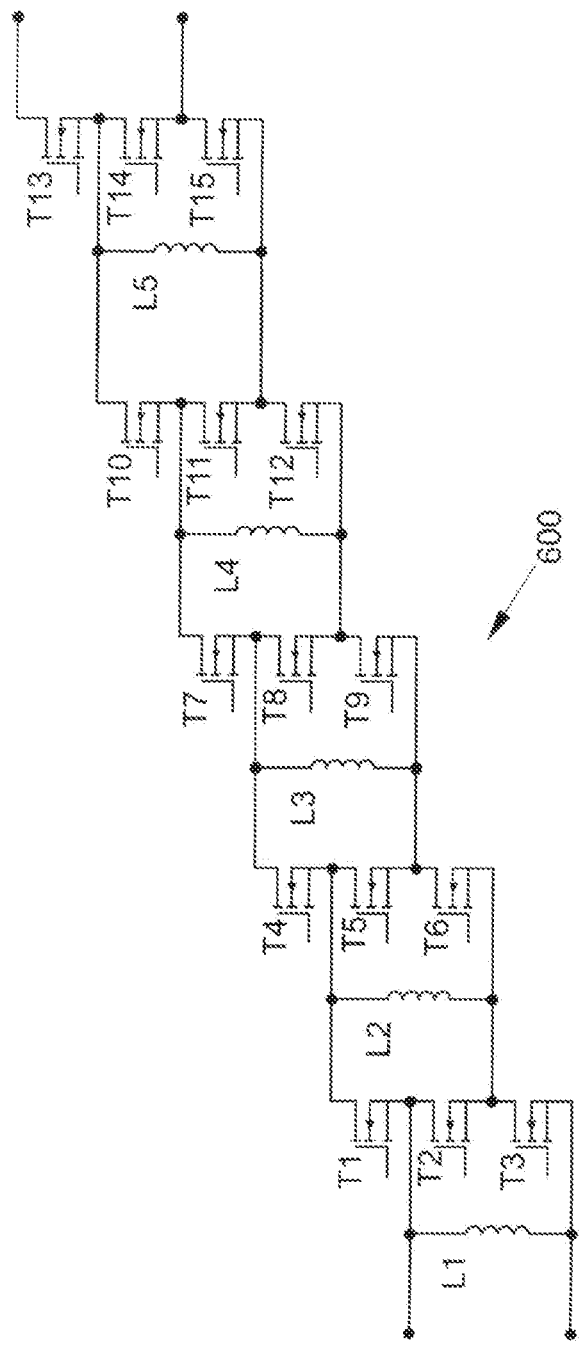
FIG. 6 shows an electronic system in accordance with an embodiment of the invention.

The electronic system 600 illustrated in FIG. 6 differs from the electronic system 500 in that, in particular, transistors (e.g. field-effect transistors or insulated-gate bipolar transistors) are used as switching elements T1 to T15.

Figure 7:
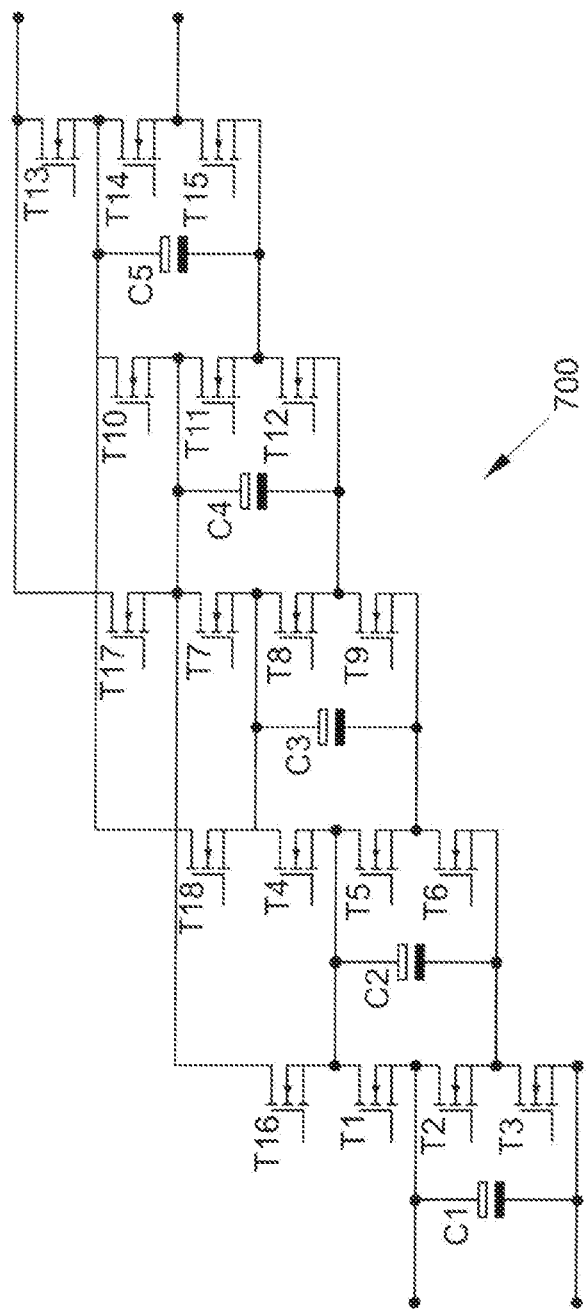
FIG. 7 shows an electronic system in accordance with an embodiment of the invention with the possibility of connecting first instances of the energy storage elements in parallel with one another and of bypassing second instances of the energy storage elements.

In comparison with the electronic system 100 from FIG. 1, further switching elements T16 to T18 are used in the electronic system 700 illustrated in FIG. 7 in order to enable bypassing of the energy storage elements C2 and C3 while at the same time connecting the energy storage elements C1, C4 and C5 in parallel by switching the switching elements T1, T3, T6, T9, T10, T12, T13, T15 and T16 to the on state.

It is possible to achieve a parallel connection of the energy storage elements C1 and C5 while at the same time bypassing the energy storage elements C2 to C4 by switching the switching elements T1, T3, T6, T9, T10, T12, T13, T15, T16 and T17 to the on state.

It is possible to achieve a parallel connection of the energy storage elements C1, C3, C4 and C5 while at the same time bypassing the energy storage element C2 by switching the switching elements T1, T3, T6, T7, T9, T10, T12, T13, T15 and T16 to the on state.

Figure 8:
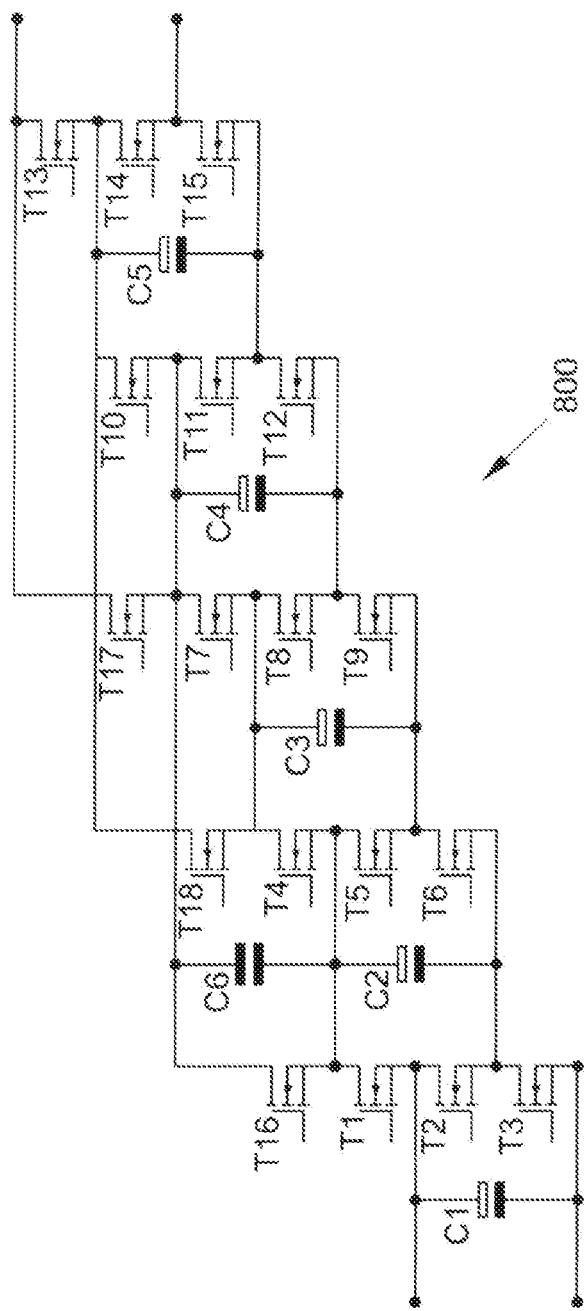
FIG. 8 shows the electronic system from FIG. 7 with a further energy storage element.

The electronic system 800 illustrated in FIG. 8 differs from the electronic system 700 from FIG. 7 by the added energy storage element C6, in particular, which is connected in series with the energy storage element C2. It is therefore no longer possible to bypass the energy storage element C2 in the electronic system. However, the energy storage elements C3 and C4 can still be bypassed as described above.

Figure 9:
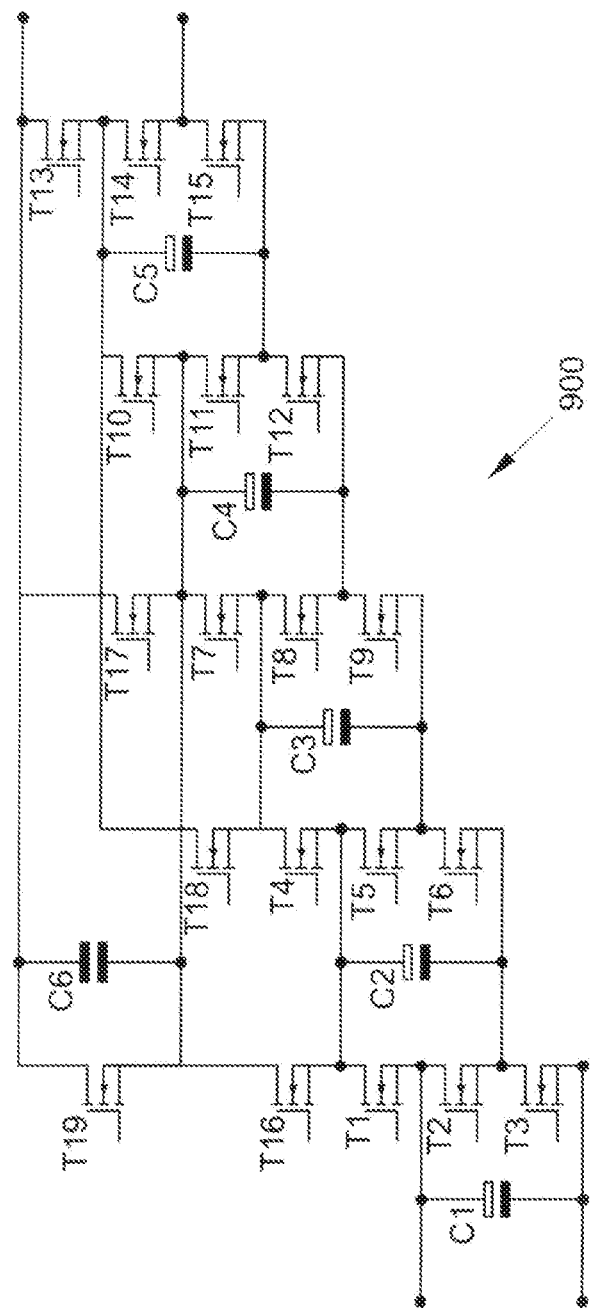
FIG. 9 shows an electronic system in accordance with an embodiment of the invention with the possibility of connecting first instances of the energy storage elements in parallel with one another and of bypassing second instances of the energy storage elements with a further energy storage element.

The electronic system 900 illustrated in FIG. 9 differs from the electronic system 800 from FIG. 8 by the position of the energy storage element C6, in particular. Said element is not connected in series with the energy storage element C2 but is instead actuated separately by switching the switching elements T16 and T19 to the on state. Said element can be used as an energy source when the energy storage elements C2 to C4 are bypassed.

What is claimed is:
1. An electronic system comprising:
two input terminals;
two output terminals;
a plurality of energy storage elements including:
  inner energy storage elements, and
  outer energy storage elements, wherein a first outer energy storage element is connected between the two input terminals;
a plurality of switching element pairs including:
  lower switching element pairs, each respective lower switching element pair connected in parallel with a respective energy storage element, and
  upper switching element pairs connected in series with each other, each upper switching element pair connected in series with the respective lower switching element pair and the respective energy storage element;
an uppermost switching element, wherein:
  the plurality of energy storage elements further includes an upper energy storage element connected in parallel with the uppermost switching element, and
  the upper energy storage element is separately actuated by the uppermost switching element and the upper switching element pairs.
2. The electronic system of claim 1, wherein: some energy storage elements are passable and at least one energy storage element is not passable.
3. The electronic system of claim 1, wherein:
the energy storage elements are configured to be selectively switched to a first, a second or a third state by switching the switching element pairs,
in the first state, the energy storage elements are connected in series with one another,
in the second state, the energy storage elements are connected in parallel with one another,
in the third state, the energy storage elements are bypassed,
two of the energy storage elements are each connected by no more than three switching elements of the switching element pairs, each of the no more than three of the switching elements being unidirectional switches that only switches between an off state and an on state;
when first energy storage elements of the plurality of energy storage elements are connected in parallel, second energy storage elements of the plurality of energy storage elements are configured to be bypassed.
4. The electronic system as claimed in claim 3, wherein the electronic system is embodied as a converter.

5. The electronic system as claimed in claim 3, wherein the switching element pairs and the energy storage elements are configured to be connected to one another in a modular manner.

6. The electronic system as claimed in claim 3, wherein the system comprises a control element, which is configured to switch switching elements of the switching element pairs.

7. The electronic system as claimed in claim 3, wherein the energy storage elements are embodied as capacitors, battery cells, solar cells or electromagnetic energy stores.

8. The electronic system as claimed in claim 3, wherein the switching elements of the switching element pairs are embodied as mechanical switches, transistors or thyristors.

9. The electronic system as claimed in claim 3, wherein:
the electronic system further comprises at least one deactivation element, which is associated with a first energy storage element,
the first energy storage element is configured to be switched to a deactivated state by the deactivation element.

10. The electronic system as claimed in claim 3, wherein second energy storage elements are bypassed by switching at least one of the switching elements.

11. The electronic system as claimed in claim 10, wherein, when the second energy storage elements are bypassed, a third energy storage element (L; C) of the energy storage elements is configured to be connected in parallel with the first energy storage element.

* * * * *